United States Patent [19]

Padek

[11] 3,726,293
[45] Apr. 10, 1973

[54] VEHICLE CLEANING SYSTEM
[75] Inventor: Ted Padek, Tulsa, Okla.
[73] Assignee: Detergent Engineering Corporation, Tulsa, Okla.
[22] Filed: Nov. 11, 1971
[21] Appl. No.: 197,790

Related U.S. Application Data

[63] Continuation of Ser. No. 815,319, April 11, 1969, abandoned.

[52] U.S. Cl. .................................... 134/45, 134/172
[51] Int. Cl. ............................................. B08b 3/02
[58] Field of Search ....................... 134/45, 123, 172

[56] References Cited

UNITED STATES PATENTS

| | | | |
|---|---|---|---|
| 3,339,565 | 9/1967 | Williams | 134/123 X |
| 3,351,076 | 11/1967 | Haines | 134/123 X |
| 3,370,596 | 2/1968 | Daum et al. | 134/45 |
| 3,506,020 | 4/1970 | De Niro | 134/45 |
| 3,511,251 | 5/1970 | Hickman | 134/181 X |
| 2,689,577 | 9/1954 | Dunn et al. | 134/123 |
| 2,922,173 | 1/1960 | Lind et al. | 134/123 X |
| 3,079,935 | 3/1963 | Padek | 134/45 |
| 3,088,472 | 5/1963 | Haines | 134/123 X |
| 3,167,797 | 2/1965 | Hergonson | 134/123 X |
| 3,195,546 | 7/1965 | Tonkowich et al. | 134/45 |
| 3,258,019 | 6/1966 | Bellas et al. | 134/123 X |
| 3,259,138 | 7/1966 | Heinicke | 134/123 UX |
| 3,265,087 | 8/1966 | Livingston | 134/123 UX |
| 3,288,109 | 11/1966 | Smith, Jr. et al. | 134/123 X |
| 3,324,868 | 6/1967 | Kaufman | 134/123 |

*Primary Examiner*—Robert L. Bleutge
*Attorney*—Tom Arnold et al.

[57] ABSTRACT

An automatic vehicle cleaning system suitable for use in the bay of a service station, or the like, and having a pre-soak cycle, a wash cycle, a regular rinse cycle, and a de-ionized rinse cycle, in that order. The vehicle is first driven into the bay through a gentle spray curtain of heated fluid containing a wetting agent. Next, a rectangular overhead rack is lowered and then raised about the vehicle while discharging a heavy spray of detergent solution, and then lowered and raised about the vehicle a second time while rinsing the vehicle with tap water or the like. When the rectangular rack is restored to its overhead position the second time, it then automatically flushes the vehicle with de-ionized water to wash away the tap water, and the vehicle may then be backed out of the bay and air dried.

8 Claims, 10 Drawing Figures

FIG. 1

Ted Padek
INVENTOR

BY Arnold, Roylance,
Kruger & Durbee
ATTORNEYS

Ted Padek
INVENTOR

BY Arnold, Roylance,
Kruger & Durkee

ATTORNEYS

PATENTED APR 10 1973 3,726,293

Ted Padek
INVENTOR

BY Arnold, Roylance,
Kruger & Durkee
ATTORNEYS

VEHICLE CLEANING SYSTEM

This is a continuation of Ser. No. 815,319, filed Apr. 11, 1969, now abandoned.

BACKGROUND OF INVENTION

This invention relates to improved apparatus for cleaning vehicles, and more particularly relates to cleaning methods and apparatus adapted to receive and discharge a vehicle within a limited length of time.

It is well known that it is necessary to wash the exterior surfaces of trucks and cars at frequent intervals in order to preserve their appearance, and automatic and semi-automatic systems are also well known which are adapted to receive a soiled vehicle and to discharge it clean within a limited time interval such as 10–15 minutes.

Many types of automatic and semi-automatic cleaning systems have been built, and many of these are now in use. Some types employ only high pressure sprays of detergent and rinse water to remove accumulations of soil. In some cases, the vehicle is bathed with a gentle spray of detergent, and is then manually scrubbed before being rinsed by a shower of tap water. In other cases, mechanical brushes and soft or fluffy rollers are automatically passed over the surfaces of the vehicle to replace the manpower used by other systems.

In some systems the vehicle is driven or hauled progressively past one or more washings and rinsing stages. In other systems, the cleansing and/or rinsing equipment moves about a stationary vehicle.

There has long been a need for automatic or semi-automatic methods and apparatus for effectively and economically cleaning a vehicle, since the task is arduous and time-consuming when performed entirely by hand. In particular, there has long been a need for a system of this type which is suitable for use in a service station and the like. However, no such system has been provided which is free from one or more counterbalancing limitations or disadvantages.

For example, it has been found impossible to effectively clean the surfaces of a vehicle by merely flushing it with a spray of detergent, unless the vehicle is repeatedly cleaned at very frequent intervals. On the other hand, the object of a system employing a high pressure detergent spray is to save both time and money and if the automatic spray is supplemented with manual scrubbing to actually remove the dirt, this defeats the fundamental purpose of such a system. This is also true if the vehicle is manually wiped after rinsing, in order to eliminate unsightly streaks or spots which may otherwise appear if the vehicle is permitted to "air dry."

Other prior art systems have included two or more detergent or wash spray racks or stations located at spaced-apart locations along the path of the vehicle, whereby the vehicle is subjected to two or more successive high pressure sprays of detergent before progressing through a rinse rack or station. Such a system is obviously capable of cleaning a vehicle somewhat more effectively than a system employing only one detergent spray station. However, such a system obviously uses at least twice as much hot water, and it is completely impractical to provide a water heater large enough to keep two or more spray stations continuously supplied with hot detergent solution during periods of heavy vehicle traffic. In addition, it has been discovered that the detergent solution which stands on the surfaces of the vehicle as it progresses from one wash station to another is actually more effective to loosen the soil than is the mechanical effect of the force or impact of the detergent solution at the first spray station.

Another disadvantage with the prior art system is that they cannot ordinarily be installed and used in existing buildings of conventional design, and that they are particularly unsuited for installation and use in a three-sided enclosure such as the bay of the conventional service station. In those instances wherein the vehicle is immobilized and the cleaning machinery travels about the vehicle, or in the case of a system having two or more wash stations, the system is too large or too long to be accommodated in a conventional bay. On the other hand, those systems employing the "drive through" concept cannot be used since they require an exit different from the entrance. Finally, those systems which employ large revolving brushes or cylindrical rollers of felt or the like are invariably too large to be installed in the average bay.

PREFERRED EMBODIMENT

These disadvantages of the prior art are overcome with the present invention, and novel apparatus are provided for effectively cleaning the exterior surfaces of a vehicle in the minimum possible time and with a minimum supplementation of manual scrubbing and wiping.

In a preferred embodiment of the invention, the vehicle is initially bathed relatively gently with a hot low pressure discharge of liquid containing a wetting agent. The temperature of the liquid is preferably as high as possible (for example, 160°–180° F.) but not high enough to damage painted surfaces or rubber fittings or the like. Any suitable wetting agent may be used which will substantially lower the surface tension of the initial bathing fluid, and it may be either detergent or non-detergent in character.

It is the function of the initial bath of the hot liquid and wetting agent, hereinafter referred to as the "presoak," to loosen the grime of the surfaces of the vehicle, and thus a preselected minimum period of 4–5 seconds or more is preferably permitted to elapse before the next stage of the process. After this "soaking period" has expired, however, the vehicle is subjected to a heavy high-pressure discharge of heated or unheated detergent solution to dislodge and flush the loosened soil from the surfaces of the vehicle. Thereafter, the vehicle is rinsed by a similar discharge of rinse solution which, for present purposes, may be ordinary tap water.

As hereinbefore stated, the prior art systems which utilize two or more regular detergent sprays use detergent solution at a rate which often overrides the capacity of the water heater. In the preferred form of the present invention, there is substantially less utilization of hot solution, whereby the present invention will handle vehicles at a greater frequency.

It is now recognized that it is impossible in most instances to air-dry a vehicle which has been rinsed with untreated tap water, without leaving unsightly spots and streaks on those surfaces of the vehicle such as the windows, the painted fenders etc., and the chromium-plated trim. On the other hand, it is also now realized that is is impractical to maintain a supply of softened water adequate to rinse away the detergent if the vehicle traffic is even moderately heavy.

In the present invention, this disadvantage of the prior art is overcome by providing a secondary rinse of de-ionized water, immediately following cessation of the regular rinse cycle, wherein the vehicle is rinsed with only enough de-ionized water to flush away the tap water. Accordingly, the vehicle may now be air-dried with little or no spotting or streaking, and the reservoir or system of de-ionized water which must be provided need only be of moderate size or capacity.

The foregoing system is especially suited for use in structures such as a bay in a service station or the like. In one particular embodiment, a pair of inverted U-shaped upright racks are arranged inside the bay and straddling the path of the vehicle, with the front rack immediately inside the entrance to the bay, and with the rear rack spaced at or toward the rear of the bay a distance sufficient to accommodate the vehicle sought to be received and washed. A rectangular overhead rack is suspended between the upper ends of the two upright racks by means of cables which are connected to drums mounted on a revolving motor-driven shaft.

The system preferably includes an actuating hose and switch assembly located on the floor of the bay in front of the rear upright rack and across the path of the vehicle. Another hose actuator may be similarly located in front of the front upright rack. A back and/or wheel wash and rinse manifold and nozzle assembly may be supported by the front and rear upright racks, with the nozzles arranged to direct their outputs at the back and wheel portions of the vehicle after it has been moved into the bay beneath the overhead rack.

In operation, the front wheels of the approaching vehicle may actuate the system automatically by running over the front hose actuator. Alternatively, the system may be energized by a manually-operated switch.

When actuated, a curtain of hot presoak solution will be provided across the entrance to the bay, and the vehicle may be driven slowly into the bay through the curtain of hot pre-soak fluid. When the front wheels reach and compress the rear hose actuator, this will cut off the discharge of pre-soak fluid, thereby informing the driver that the vehicle is properly located or arranged in the bay beneath the overhead rack. Alternatively, signal lights may be provided as will hereinafter be explained.

At this stage, a hard discharge of detergent solution may be ejected down, round and onto the stationary vehicle, and the motor-driven shaft will revolve in one direction to slowly lower the overhead rack about the vehicle. When the rack reaches a preselected location adjacent the wheels of the vehicle, suitable circuitry may automatically respond, to reverse the rotary direction of the shaft, and to gradually hoist the rectangular rack back up to its initial overhead position.

When the "wash cycle" hereinbefore described has been completed, the system may shift automatically to the rinse cycle, either immediately or after a preselected delay interval, or the system may de-energize until the rinse cycle is initiated manually by a suitable hand-operated switch. Alternatively, the back and/or wheel wash assemblies may be either manually or automatically selected and energized, whereupon high-pressure jets of detergent may be ejected directly onto the wheel and rear portions of the vehicle during a preselected time interval such as 30 seconds.

If there is a time delay provided between the wash cycle and the rinse cycle, whether preselected or indeterminate, certain particularly difficult portions of the vehicle, such as the grill of the vehicle and whitewall tires if any, may be washed during this interval with suitable auxiliary hand guns. At the conclusion of all operations composing the wash cycle, however, the overhead rack (and the wheel and back wash manifold, if desired) may now discharge a heavy flush of tap water against the vehicle, and the overhead rack may again be traveled down about the vehicle and back up again as heretofore described, whereupon the discharge of tap water will cease automatically and be followed by a spray of de-ionized water for a preselected interval such as 15 seconds.

At this stage, the cleaning operation ceases automatically and the vehicle may now be backed out of the bay and parked somewhere to air-dry.

SUMMARY OF INVENTION

It is an object of the present invention to provide novel apparatus for cleaning a vehicle wherein the vehicle is first bathed with a gentle discharge of hot or heated liquid containing a suitable wetting agent before being subjected to a heavy discharge of detergent solution.

It is another object of the present invention to provide novel apparatus for cleaning a vehicle, wherein the vehicle is first rinsed with a copious discharge of tap water or the like, and wherein the vehicle is thereafter flushed with de-ionized water during a preselected time interval to remove the tap water.

It is a further object of the present invention to provide novel apparatus suitable for use in a service station bay or the like, wherein a rectangular overhead cage-like rack is lowered and thereafter raised about the sides of the vehicle to progressively wash and then rinse the vehicle.

It is another further object of the present invention to provide novel apparatus for cleaning a vehicle, wherein a discharge of detergent solution is selectively directed against the rear and wheel portions of the vehicle during a preselected time interval immediately following the first down and up trip of the overhead rack.

These and other features and advantages of the present invention will be apparent from the detailed description hereinafter provided, wherein reference is made to the figures in the accompanying drawings.

DETAILED DESCRIPTION

Figure 1:
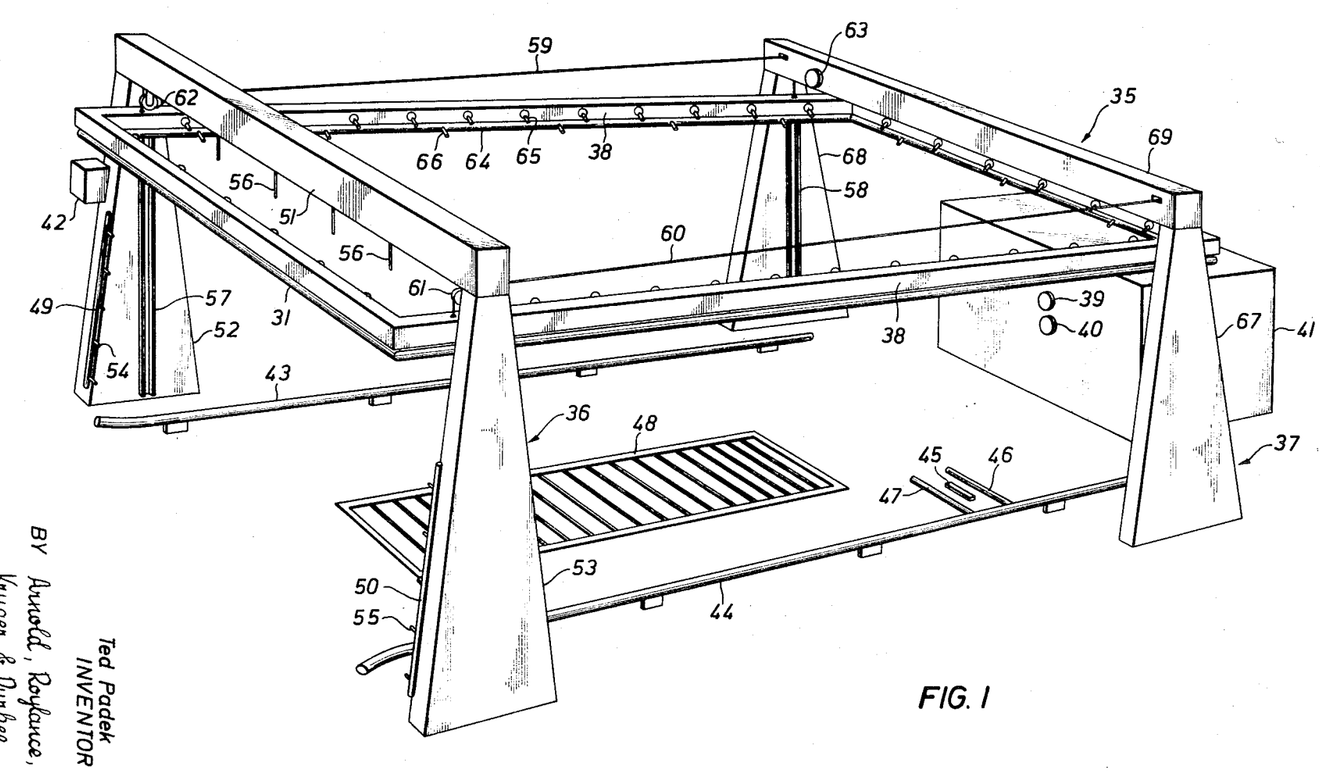
FIG. 1 is a pictorial representation of an exemplary form of vehicle cleaning apparatus embodying the concept of the present invention.

Referring now to FIG. 1, there may be seen a simplified pictorial representation of one form of apparatus embodying the concept of the present invention, and suitable for cleaning the exterior surfaces of a vehicle, and the like. More particularly, there is disclosed apparatus suitable for installation and operation in a bay or other similar enclosure having a singel common entrance and exit, and including a forward manifold rack 36 of the type depicted in U.S. Pat. No. 3,079,935, which is preferably erected immediately inside the entrance to the bay and straddling the path of any vehicle entering the bay (not depicted). In addition, there may be seen a rear manifold rack 37, having a configuration generally similar to the forward manifold rack 36, and erected across the path of the vehicle at the rear or interior end of the bay. The rear manifold rack 37 is preferably spaced a sufficient distance so as to accommodate a vehicle longitudinally located between the two manifold racks 36 and 37.

The forward manifold rack 36 may be composed ot two A-frame support members 52 and 53 vertically erected on each side of the path of the vehicle, with a suitable cross member 51 supported on top of the two A-frame members 52 and 53. Similarly, the rear manifold rack 37 may be seen to be composed of a pair of A-frame support members 67 and 68 arranged to support a connecting cross member 69.

A traveling overhead manifold rack 38 having a generally rectangular configuration, may be suspended from the forward and rear manifold racks 36 and 37 by a system of cables as will hereinafter be explained in detail. A suitable equipment console 41 containing tanks and valves, and the like, may be located at any suitable location within or adjacent the bay.

As may be further seen in FIG. 1, a suitable spray manifold 49 is preferably erected vertically on the forward face or surface portion of the left or off hand A-frame support member 52, and preferably provided with spaced-apart output nozzles 54. Similarly, another spray manifold 50 is provided on the corresponding forward portion of the right hand A-frame support member 53, and also provided with a plurality of suitable output nozzles 55. Another spray manifold (not depicted in FIG. 1) is preferably mounted in the forward cross member 51, with a plurality of downwardly aimed output nozzles 56.

A suitable wash and rinse manifold (not depicted in FIG. 1) may be mounted in all four side portions of the overhead manifold rack 38 and provided with inwardly and downwardly directed output nozzles 65. In addition, another rinse manifold, hereinafter referred to as the de-ionized water manifold 64, may be suspended on the underneath side of the overhead manifold rack, and also provided with a suitable number of output nozzles 66.

Other basic components of the system may include a pair of indicator lights hereinafter referred to as the red light 39 and the amber light 40, which lights are preferably located so as to be visible to a driver in the vehicle. Suitable left and right guard rails 43 and 44 may also be provided as illustrated, to keep the vehicle from being driven into any portion of the apparatus, and a suitable water drain 48 may be provided to carry away detergent and rinse water. In addition, a control box 42 may be conveniently mounted on the forward portion of the left A-frame support member 52.

During operation of the system depicted in FIG. 1, a hot pre-soak solution containing a suitable wetting agent may be routed at a relatively low pressure into the manifolds 49 and 50 mounted in the forward manifold rack 53. The pre-soak solution is thereupon discharged through nozzles 54-56 to provide a gentle curtain of spray across the entrance to the bay. The vehicle may then be driven slowly into the bay and through the pre-soak spray curtain. During this stage of the sequence, the amber indicator light 40 will be illuminated to inform the driver that the system is cycled to receive his vehicle. However, as the right front wheel of the vehicle rolls over the forward wheel stop 47 and onto the rear actuator hose 45, the pre-soak spray curtain will be discontinued by suitable control means as hereinafter explained, the amber indicator light 40 will be extinguished, and the red indicator light 39 will then be illuminated to advise the driver to stop the vehicle. As will hereinafter be explained, the system may include fail/safe provisions which will deactivate the system if the vehicle continues past the rear actuator hose 45, however.

At this stage of the operating cycle, a high-pressure detergent spray may be cycled into the wash and rinse manifold (not depicted in FIG. 1) located in the overhead manifold rack 38, either by means of a suitable manual control switch in the control box 42, or by automatic cycling circuitry responsive to compression of the actuator hose 45 by the vehicle wheels. Accordingly, detergent spray may then be discharged at a high pressure against the vehicle from the output nozzle 65, and the travel motor 63 may be energized. Accordingly, the travel motor 63 will now be driven at a suitable shaft velocity in one direction to pay out the cable system hereinbefore described, and to lower the overhead manifold rack 38 gradually downward about the sides of the vehicle until it reaches its downward limit of travel at a location which may be adjacent the wheels and lower fender portions of the vehicle. Upon reaching this travel limit, however, a suitable travel limit switch (not depicted in FIG. 1) will be actuated to reverse the direction of the travel motor 63. Thus, the travel motor 63 will now hoist the overhead manifold rack 38 up about the vehicle at the same speed until it is returned to its original overhead position.

Return of the overhead manifold rack 38 to its original elevated position will actuate a second upper travel limit switch (not depicted in FIG. 1). Depending upon the operating cycle which has been previously selected by means of the controls in the control box 42, operation of the system may now be suspended until or unless manually re-activated, or unless the system has previously been programmed to automatically begin the rinse cycle. If the manual operating cycle has been selected, the wheels, bumper, and other more or less accessible portions of the vehicle, may be manually cleaned by means of a hand spray gun or other suitable device during the interval between the wash and rinse cycles. Thereafter, the rinse cycle may be actuated by suitable manual control means as hereinbefore described. Alternatively, if the system has been programmed for automatic operation, the rinse cycle is initiated (either immediately or after a preselected delay interval) by the aforementioned upper limit switch, and rinse water from an ordinary tap water supply may be routed into the wash and rinse manifold in the overhead rack 38, and discharged out through the nozzles 65 to flush off the vehicle. During this portion of the rinse cycle, the overhead rack 38 will again move downward about the vehicle until it reaches the lower travel limit switch (not depicted in FIG. 1), whereupon the travel motor 63 will again be reversed to return the overhead rack to its original overhead position.

When the overhead rack 38 reaches its original elevated position for the second time, the upper travel limit switch (not depicted in FIG. 1) will again be actuated and de-ionized water will now be routed into the separate de-ionized water manifold 64 on the overhead rack 38 and out through its nozzles 66 during a preselected limited time period (such as fifteen seconds). This bath of de-ionized water will displace all tap water accumulated or standing on the exterior surfaces of the vehicle, thereby permitting the vehicle to be "air-dried" without leaving streaks and other unattractive spots which would normally appear on the surfaces of the vehicle if it was "air-dried" following the tap water rinse cycle.

The actuator hose 45 is preferably located in some form of a wheel well, whereby the vehicle wheel may be more easily positioned to depress the hose 45. As depicted in FIG. 1, the wheel well may conveniently be formed by two sections of pipes disposed on opposite sides of the hose 45, and functioning as wheel stops 46 and 47. The operator of the vehicle will be aware of the fact that his right forward wheel has entered between the two wheel stops 46 and 47 because of the detent effect which will be felt through the steering column of the vehicle. However, if the vehicle is inadvertently driven past or over the forward wheel stop 46, or if the vehicle rolls backward so that the right forward wheel rolls back onto the rear wheel stop 47 to release the actuator hose 45, the entire system 35 will immediately be de-activated as a fail/safe measure. Thus, the system 35 will only be responsive as long as the actuator hose 45 is maintained in a compressed and actuated condition.

It is desirable that the overhead manifold rack 64 travel up and down about the sides of the vehicle without striking or catching any portion of the vehicle. On the other hand, it is also desirable that the sides of the overhead manifold rack 38 and the projecting nozzles 65 and 66, be spaced as close as possible to the exterior surfaces of the vehicle. Accordingly, the overhead rack is preferably slidably mounted in guide tracks 57 and 58 which hold the overhead rack 38 in a fixed position relative to the vehicle during up and down movement.

Figure 2:
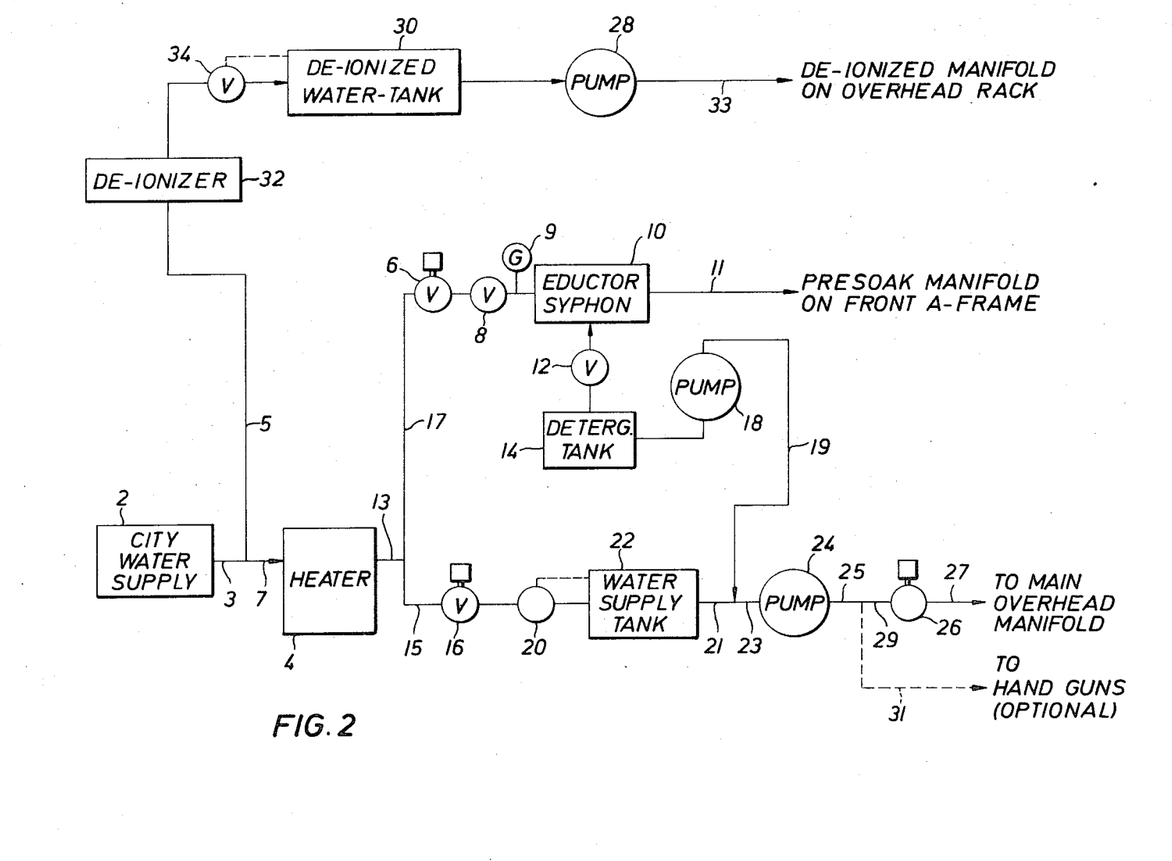
FIG. 2 is a functional diagram of a portion of the apparatus depicted in FIG. 1.

Referring now to FIG. 2, there may be seen a functional representation of the various fluid flow circuits and control components included in the system and preferably located within the equipment console 41. Accordingly, it may be seen that ordinary water which may be drawn from any source of supply, such as tap water from a city water system 2, is routed continually through conduits 3 and 7 to a conventional water heater 4, and through conduit 5 to a suitable de-ionizer assembly 32 of conventional design.

The output conduit 13 from the heater 4 is connected to conduits 15 and 17. As may be seen, heated water flowing through conduit 15 may be passed into a suitable water supply tank 22 by means of a water solenoid control valve 16. A conventional float-actuated shutoff valve 20 may be provided to prevent overflow in the water supply tank 22. In addition, heated water is conducted through conduit 17 and a suitable pre-soak solenoid control valve 6 into the input side of a suitable eductor or siphon 10. Fluid flow through the eductor 10 will thus draw detergent solution out of the detergent tank 14, and through a suitable manual control valve 12, if desired for commingling with the heated water from the valve 6, and the mixture is then ejected through conduit 11 as a hot pre-soak solution into the spray manifold 49 and 50 mounted on the A-frame support members 52 and 53, and into the spray manifold (not depicted in FIG. 1) in the cross member 51.

Referring again to FIG. 2, detergent solution may be drawn from the detergent tank 14 by means of a suitable detergent pump 18 and transferred by conduit 19 into the input side of a suitable water pump 24. In addition, the water pump 24 is also connected to draw tap water from the output conduit 21 out of the water supply tank 22. Conduits 19 and 21 connect to conduit 23 to provide a commingled flow of tap water and detergent solution to the pump 24, and thus a properly blended solution of water and detergent fluid is made available through conduits 25, 27 and 29 to the overhead wash and rinse manifold housed in the overhead manifold rack 38. Input to the overhead wash and rinse manifolds, however, is controlled by the wash and rinse control valve 26. As may also be seen, a suitably blended wash solution may be delivered to one or more auxiliary hand guns by a flexible conduit 31, for manual cleaning of wheels and fender interiors as hereinbefore mentioned.

The normally-closed pre-soak solenoid control valve 6 may be actuated by a suitable control switch located on the control box 42 depicted in FIG. 1. Accordingly, when the pre-soak control valve 6 is opened, water may be conducted from the heater 4 through the conduit 17 (by means of any suitable pressuring means such as city water pressure) to and through the eductor siphon 10 as hereinbefore described. Thus, detergent solution may be drawn out of the detergent tank 14 and into conduit 11 for providing the pre-soak spray curtain as hereinbefore described.

The pre-soak solenoid control valve 6 is preferably actuated only when the water solenoid control valve 16 is closed. However, the water solenoid control valve 16 is preferably interconnected as hereinafter provided, whereby it may be openable either manually or automatically, but also preferably only when the pre-soak solenoid control valve 6 is closed. More particularly, the pre-soak solenoid control valve 6 and the water solenoid control valve 16 are preferably electrically interconnected so that the water solenoid control valve 16 will always close whenever the pre-soak solenoid control valve 6 opens, and will open whenever the pre-soak solenoid control valve 6 closes.

The wash and rinse solenoid control valve 26 is preferably actuated whenever the water pump 24 is actuated. On the other hand, the detergent pump 18 will only be actuated during the wash cycle. Accordingly, it may be seen that when a detergent solution is injected through the wash and rinse manifold in the overhead manifold rack 38, both the detergent pump 18 and the water pump 24 will be actuated as well as the wash and rinse solenoid control valve 26. However, the detergent pump 18 in inactivated, and only the water pump 24 will be activated during the regular rinse cycle. Thus, detergent solution will not pass through conduit 19, and the water pump 24 will supply tap water only through the wash and rinse solenoid control valve 26 and conduit 25, 29 and 27, to the wash and rinse manifold in the overhead manifold rack 38 during the rinse cycle.

As hereinbefore stated, the regular rinse cycle is followed by the de-ionized rinse cycle, wherein a spray of de-ionized water is discharged onto the vehicle during a preselected limited time interval. This is achieved by actuation of the de-ionized rinse pump 28 only, and thus pumps 18 and 24 will both be inactive during the de-ionized rinse cycle.

Figure 3:
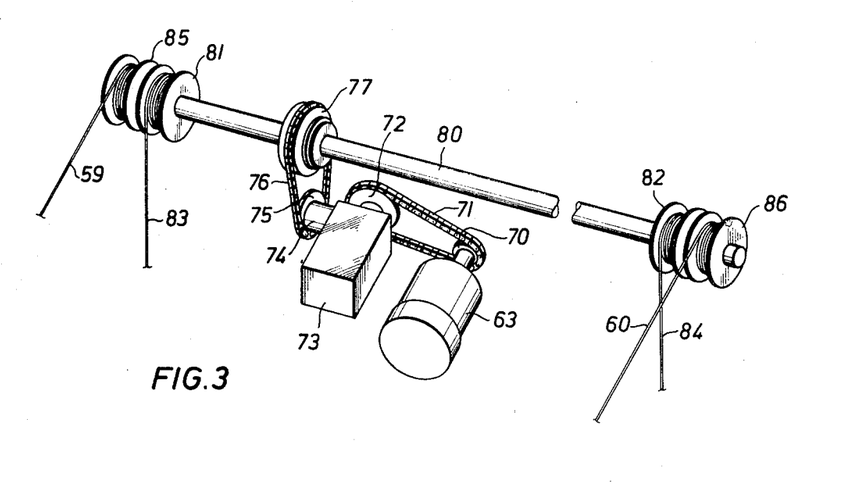
FIG. 3 is a pictorial representation of another portion of the apparatus depicted generally in FIG. 1.

Referring now to FIG. 3, there may be seen a pictorial representation of an exemplary form of driving apparatus suitable for lowering and raising the overhead manifold rack 38 about a vehicle as hereinbefore described. The depicted system may include a conventional suitable electrical motor 63 having its output shaft connected to rotate a sprocket wheel 70 which, in turn, is interconnected to an endless sprocket chain 71. The sprocket chain 71 is also interconnected to a larger sprocket wheel 72 arranged to drive a gear reduction assembly of any suitable design. The output shaft 74 of the gear reduction assembly 73 may be connected to rotate a sprocket wheel 75 which is connected to an endless sprocket chain 76, and the chain 76, in turn, is connected to a sprocket wheel 77 concentrically and fixedly mounted on a suitable drive shaft 80 which is supported in the cross member 69.

As depicted in FIG. 3, cable drums 81 and 85 may be mounted at one end of the drive shaft 80 and similar cable drums 82 and 86 mounted at its other end. Vertical cables 83 and 84 may be seen to be wound at one end about cable drums 81 and 82, respectively, and cables 59 and 60 may be wound about cable drums 85 and 86 respectively. The lower ends of cables 59 and 60 are preferably passed over pulleys 62 and 61, respectively, and then connected to the forward end of the overhead manifold rack 38. The lower ends of cables 83 and 84, however, may be connected directly to the rear end of the overhead manifold rack 38. Thus, rotation of the travel motor 63 in one direction will rotate the drive shaft 80 to pay out cables 59, 60, and 83, 84 to thereby lower the overhead manifold rack 38 about the vehicle sought to be cleaned. On the other hand, rotation of the travel motor in the opposite direction, will rotate the drive shaft 80 to wind up the cables 59, 60 and 83, 84, and thereby raise the overhead manifold rack 38.

Figure 4:
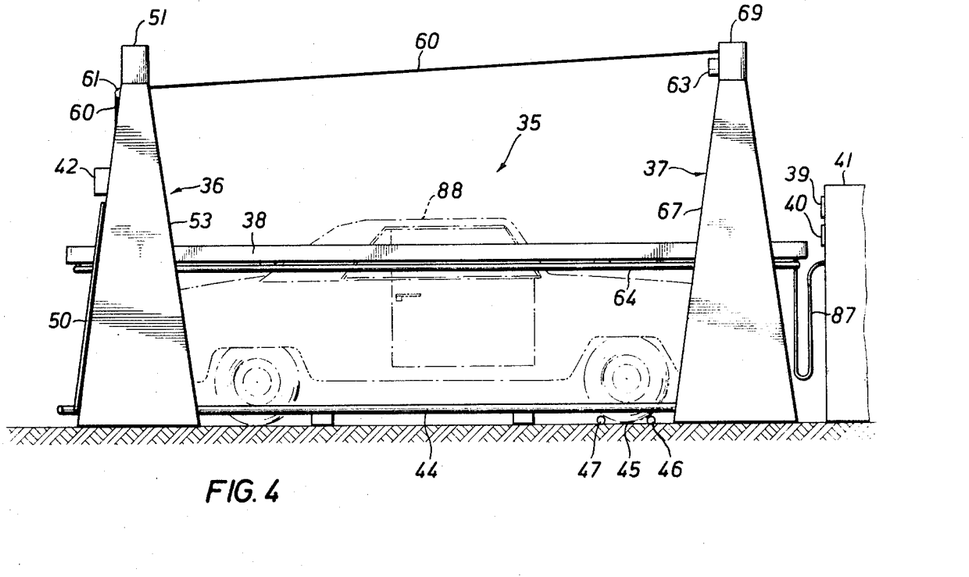
FIG. 4 is a different pictorial representation of the apparatus depicted generally in FIG. 1.

Referring now to FIG. 4, there may be seen another pictorial view of the apparatus generally depicted in FIG. 1, wherein the overhead manifold rack 38 is partially lowered about a vehicle 88 sought to be cleaned. The right front wheel of the vehicle 88 may be seen to be disposed between the rear and forward wheel stops 46 and 47, to thereby depress the actuator hose 45. Thus, if the vehicle moves far enough either forward or backward whereby the wheel rolls onto or over either of the two wheel stops 46 and 47, this will release the actuator hose 45 to thereby de-energize the cleaning system 35.

Referring again to FIG. 4, it may be seen that the equipment console 41 is located to arrange the indicator lights 39 and 40 so that they are clearly visible to the driver in the vehicle 88. The manifolds in the overhead rack 38 may be connected to the pumps and tanks hereinbefore referred to as located in the console 41, by means of flexible conduits such as the hose 87 illustrated in FIG. 4.

Figure 5A:
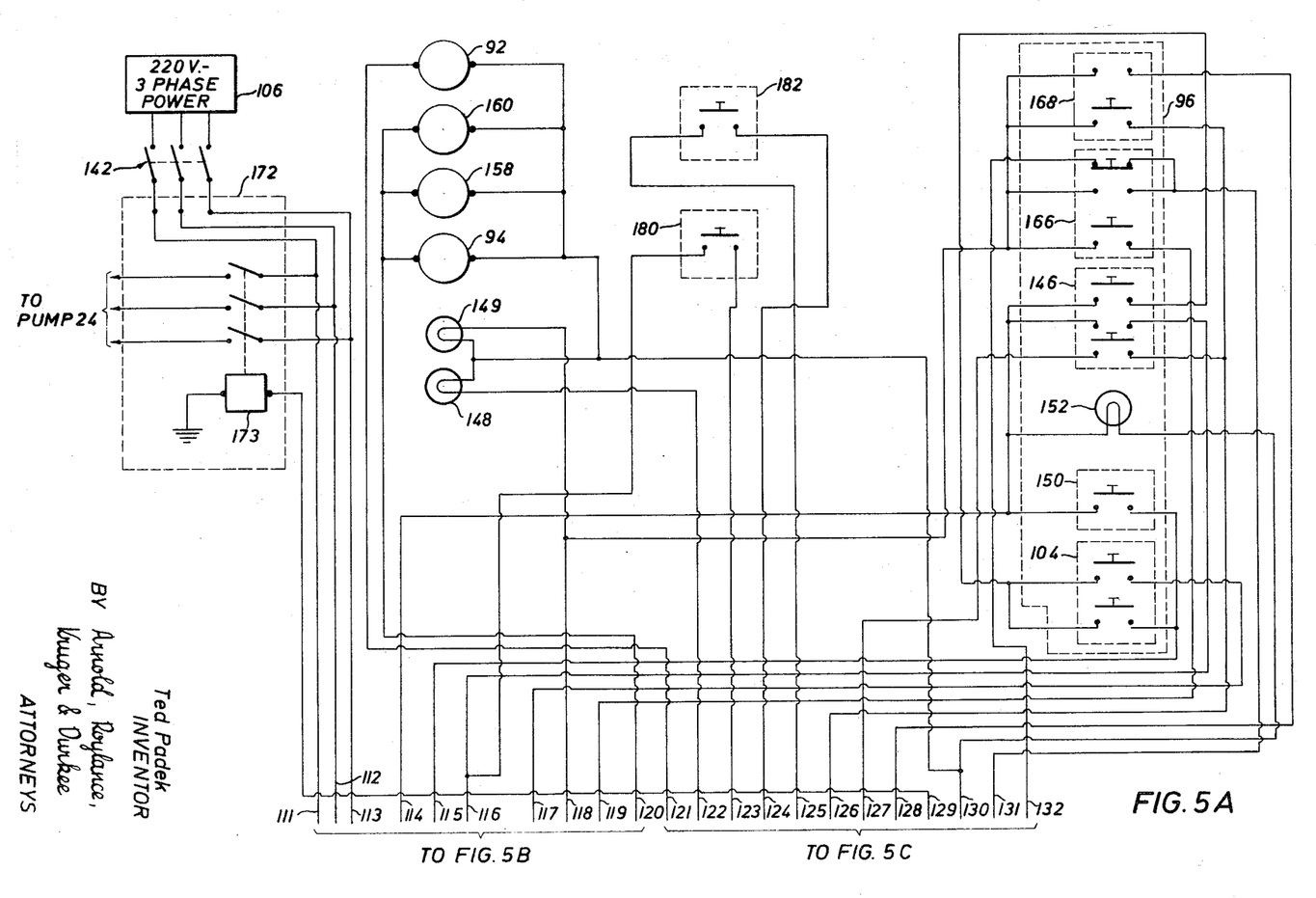
FIG. 5A is a diagram of a portion of one form of electrical control circuitry suitable for the apparatus depicted in FIG. 1.
Figure 5B:
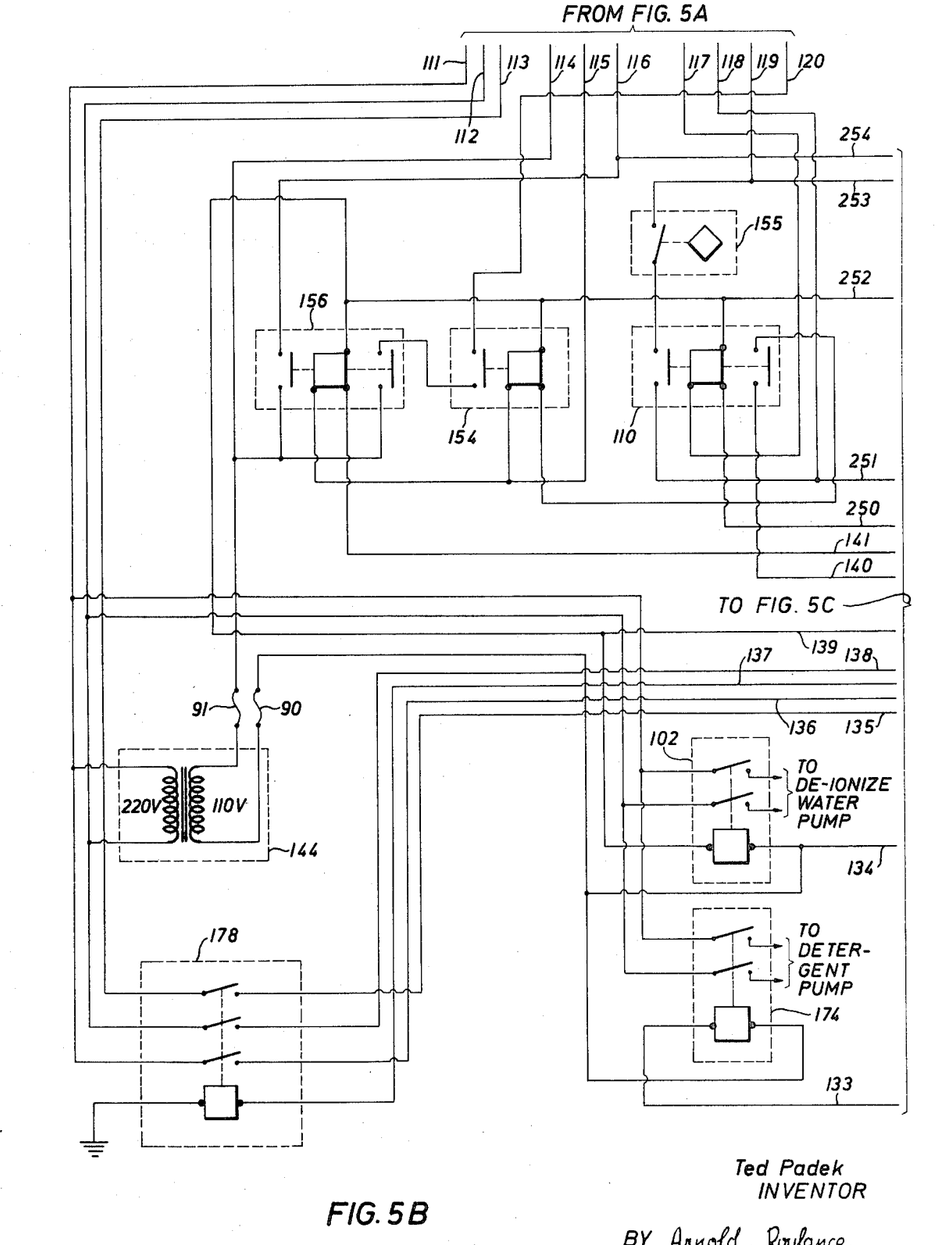
FIG. 5B is a diagram of another portion of the circuitry depicted in FIG. 5A.
Figure 5C:
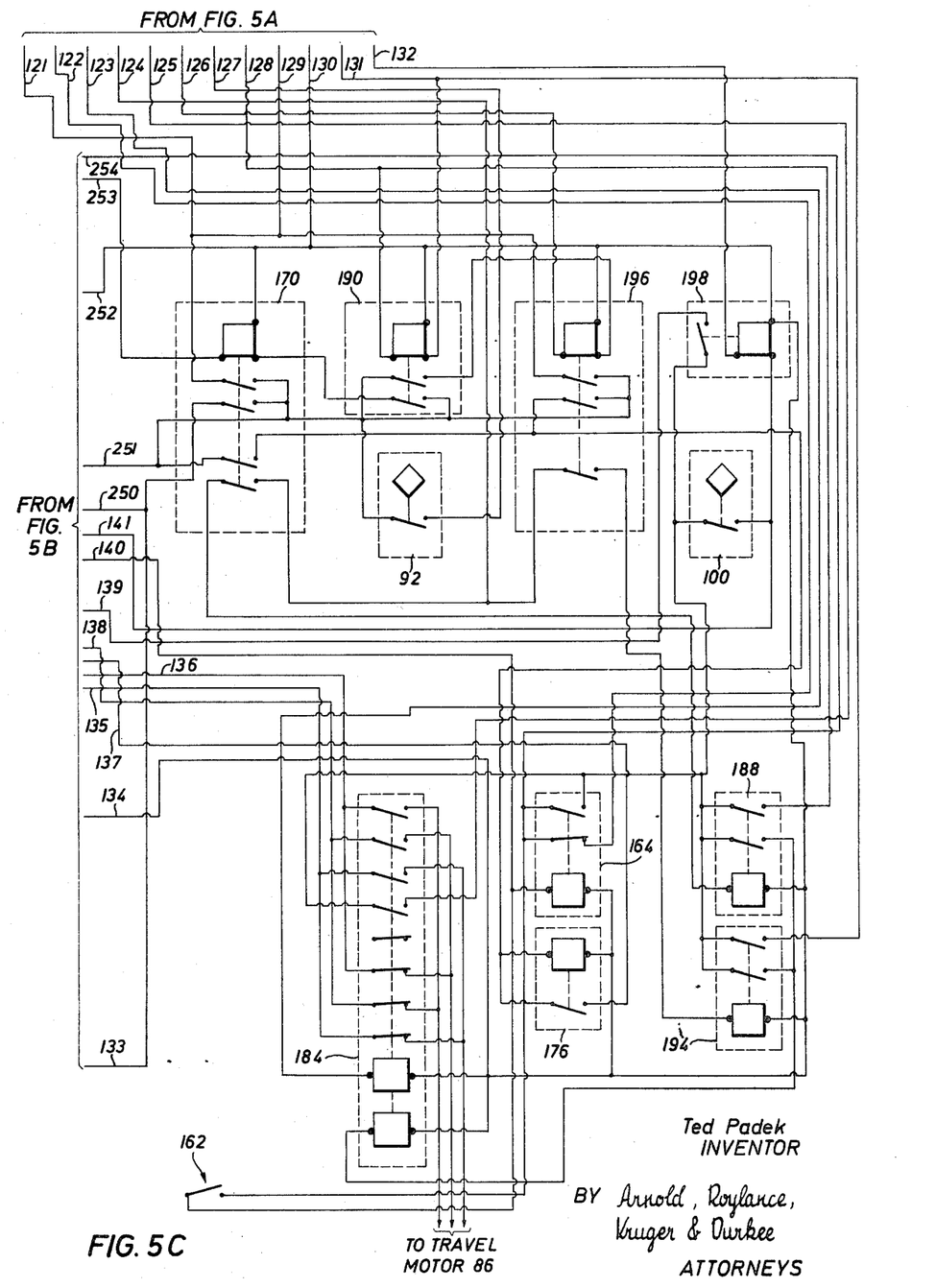
FIG. 5C is a diagram of a further portion of the circuitry partially depicted in FIGS. 5A-5B.

Referring now to FIGS. 5A, 5B, and 5C, there may be seen a schematic diagram of electrical control circuitry suitable for apparatus of the character hereinbefore described. More particularly, conductors or circuits 111–120 depicted in FIG. 5A may be seen to connect with related portions of the circuitry illustrated in FIG. 5B, and circuits 121–132 depicted in FIG. 5A connect with associated circuits depicted in detail in FIG. 5C. On the other hand, circuits 133–141 and circuits 250–254 in FIG. 5B, may be seen to connect with associated portions of FIG. 5C.

As hereinbefore stated, the system is adapted to be operated either manually or automatically. In either case, however, the operating cycle of the major portions of the circuitry depicted in FIG. 5 will be the same. Accordingly, the circuitry depicted in FIGS. 5A–C will be described with reference to the manual mode of operation, since the difference which will occur during manual operation will, in most instances, be differences of omission, and will in all instances be obvious from an understanding of the automatic mode.

At the beginning, the entire system is de-energized and both indicator or drive control lights 148 and 149 (see FIG. 5A) will be dark. When the master control switch 142 is closed, this will connect 220 volt/three phase power from a suitable power supply 106 through circuits 111–113 to the input side of a transformer 144. In addition, it may be seen that circuits 111 and 112 are connected to the input contacts of a de-ionized rinse pump relay 102 and a detergent pump relay 174, and that circuits 111–113 are also connected to the input contacts of a suitable heavy-duty relay or line starter 178 having three output contacts. These three contacts will be interconnected to the travel motor 86 by way of circuits 135, 136 and 138, and the three normally closed contacts in the travel reversing relay 184. Accordingly, 220 volt power is now available to those components in the system which require such power.

It will now be seen that 100-volt AC power is available from the output side of the transformer 144 to the operation selector switch 146 (which is preferably located or mounted on the control box 96). This switch 146 may be positioned either at "manual" or at "full automatic." In the manual mode of operation, this switch 146 will connect 100-volt power to the amber indicator light 148 and to the pre-soak switch 150. As may be seen, 110-volt power will also be connected to a suitable power indicator light 152, which functions to indicate that power is now being applied to the system, (and which may also be conveniently mounted on the control box 96).

The pre-soak switch 150 may now be closed, and this connects power to the actuating coils of the pre-soak relay 154 and the power relay 156. Accordingly, the pre-soak relay 154 will now close and this will mechanically close a suitable timer 155. When the pre-soak relay 154 is closed, power is connected to open the pre-soak solenoid 158 (of the pre-soak valve 6), and to close water solenoid 160 (of the water solenoid control valve 16) whereby water may now flow under regular city pressure through the heater 4, through the pre-soak solenoid valve 6, through the manual control valve 8, and through the eductor 10, to the pre-soak spray manifold 49 and 50.

The vehicle may now be driven slowly into the bay past the curtain of pre-soak spray until its right front (or left) wheel drops down between the wheel stops 46 and 47 to depress the actuator hose 45. This will flex the diaphragm in the normally-open wheel switch 162 connected thereto (see FIG. 5C) to close the switch 162 and thereby connect 110-volt power through the latching coil of the light control relay 164, and to open the pre-soak relay 154. The relay 164 will then close, and power will now be shifted from the amber control light 148 to the red control light 149. Thus it may be seen, that if the vehicle shifts off of the hose 45, this will release and thereby open the wheel switch 162. If this occurs, the light control relay 164 will instantly shift power from the red control light 149 to the amber control light 148, to provide a further indication that the vehicle must be positioned properly within the bay.

It may now be seen that 110-volt power is now available at the hand-operated or pushbutton wash control switch 166, and to the push-button rinse control switch 168, both of which components are also preferably mounted on the control box 96. When the hand wash switch 166 is closed, 110-volt power will be connected to the wash relay 170 and to an actuating coil 173 of a suitable line starter or heavy duty relay 172. When the line starter 172 is closed, this will connect 220-volt power from circuits 111–113 to the water pump 24 depicted in FIG. 2. In addition, power from the wash relay 170 will also activate the detergent pump relay 174, which, in turn, activates the detergent pump 18. Accordingly, detergent fluid and water will now be supplied to the wash and rinse manifold mounted in the overhead manifold rack 38.

When the wash relay 170 is closed, power will be routed to the latch coil of the travel delay timer or relay 176, which, in turn, will thereupon close following a predetermind time interval (preferably 5 seconds). This will apply 110-volt power to the actuating coil of the travel motor starter 178, whereupon this coil will close the travel starter 178, and 220-volt power will now be connected to the travel motor 186 to cause it to pay out the cables 59 and 60, and 83 and 84, to thereby lower the overhead manifold rack 38 down and around the vehicle.

It should be noted that if the wheel switch 162 is opened, 110-volt power will instantly be removed from the actuating coil of the travel motor starter 178, and this, in turn, will instantly disconnect 220-volt power from the travel motor 186. It may also be noted that when the power relay 156 is closed, this will connect power to (but not through) the lower limit switch 180 only, and not to the upper limit switch 182, This is because the upper limit switch 182 receives power from the reversing relay 184 which is always in an unlatched position at the beginning of each travel cycle. Accordingly, when the overhead manifold rack 38 descends far enough to close the lower limit switch 180, this will connect power to the latching coil of the reversing relay 184, and 110-volt power will then be connected through the reversing relay 184 to the top limit switch 182.

Latching the reversing relay 184 will cause it to reverse the 220-volt power input being supplied from the travel motor starter 178 to the travel motor 186, and this will drive the motor 186 in an opposite direction to wind the cables 59 and 60, and 83 and 84, back on the cable drums 81 and 82, and 85 and 86, thus raising the overhead manifold rack 38. When the overhead manifold rack 38 reaches its maximum upper limit of travel, this will then close the top limit switch 182. When the wash relay 170 is closed, the wash control relay 188 will also be closed. Accordingly, closing the top limit switch 182 will connect power through the wash control relay 188 to unlatch the reversing relay 184, and to thereby latch the system control relay 190. Power is now removed from the actuating coil of the travel motor starter 178, and this will disconnect 220-volt power from the travel motor 186. This completes the regular wash cycle, and readies the system to perform the regular rinse cycle.

As depicted in FIG. 5, the hand rinse switch 168 may now be closed to connect 110-volt power to the latching coil of the rinse control relay 194. When the rinse control relay 194 is closed, this will connect 110-volt power to latch the rinse relay 196, and to thereby connect power to the actuator coils of both the travel motor starter 178 and to the aforementioned main line starter 172. The travel motor starter 178 will again pass 220-volt power to the travel motor 186, to again lower the overhead manifold rack 38 until it reaches the lower limit switch 180. The main line starter 172, on the other hand, will simultaneously connect 220-volt power to the water pump 24. However, since the detergent pump relay 174 is now open, power is not connected to the detergent pump 18, and the wash and rinse manifold will now receive tap water only.

When the overhead manifold rack 38 reaches its lower limit of travel, the lower limit switch 180 will again be closed and the reversing relay 184 will again be latched to reverse the power supplied to the travel motor 186. The travel motor 186 will again raise the overhead manifold rack 38 until it reaches and closes the top limit switch 182. This will again unlatch the reversing relay 184, and thereby cut off power to the rinse control relay 194 which thereupon unlatches the rinse relay 196.

It should be noted that the rinse control relay 194 is also now unlatched, and that the de-ionized rinse relay 198 is now unlatched in order to activate the timer 100 for a preselected time interval (preferably fifteen seconds). Accordingly, 220-volt power will now be applied through the de-ionized water relay 198 to the de-ionized rinse pump relay 102. This will activate the de-ionized rinse pump 28 until the timer 100 closes, whereupon both the de-ionized rinse relay 198 and the power relay 156 will be unaltched. This will unlatch the de-ionized rinse pump relay 102 to de-activate the de-ionized rinse pump 28, and the car may now be driven out of the system. When the wheel switch 162 is released, this will unlatch the light control relay 164, and power will now be switched from the red control light 149 to the amber control light 148, to thereby indicate that the system is ready to receive another vehicle.

The operation of the circuitry depicted in FIG. 5 is essentially the same during the "full automatic" mode, which is established by positioning the operation selector switch 146 to "full automatic." Accordingly, when the master switch 142 is closed, both driver control lights 148 and 149 will be extinguished bu the power indicator light 152 will be on to indicate hat 220-volt power is now connected to the transformer 144, and 110-volt power is accordingly available to the system. To actuate the system, the full automatic switch 104 will be closed to apply 110-volt power to the latching coil of the full automatic relay 110, and to thereby close the full automatic relay 110. This will also latch the power relay 156 and the pre-soak relay 154. In addition, the amber control light 148 is now illuminated.

When the wheel switch 162 is closed, this will unlatch the pre-soak relay 154, and shift power automatically from the amber control light 148 to the red control light 149. The wash relay 170 will now be latched since the full automatic relay 110 is latched to close the circuit through the timer 155. Both the rinse and de-ionized rinse cycles will now follow automatically, and the sequence is the same as in the manual mode.

Figure 6:
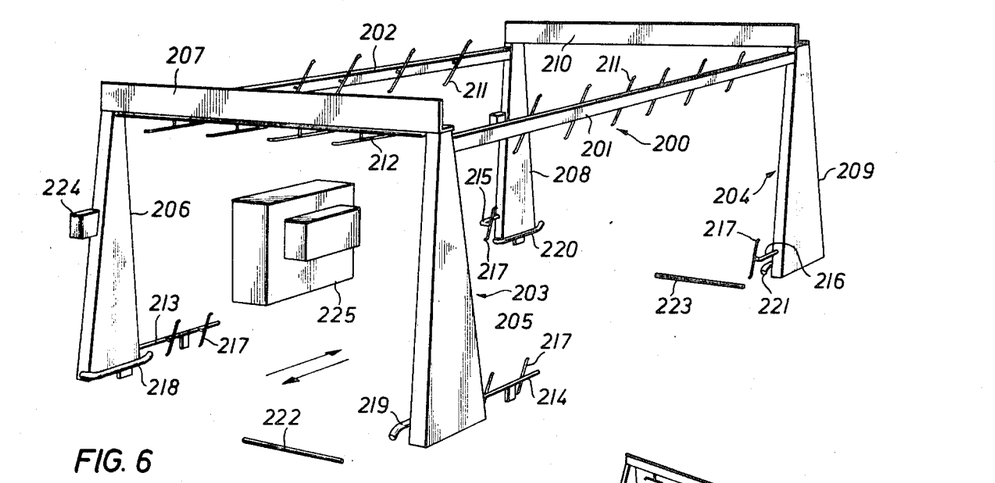
FIG. 6 is a simplified pictorial representation of the basic components of another form of the apparatus depicted generally in FIGS. 1 and 4.

Referring now to FIG. 6, there may be seen a simplified pictorial representation of another embodiment of the present invention. In particular, there is illustrated a vehicle cleaning system 200 suitable for erection and use in a bay or the like, and having a forward manifold rack 203 located inside the entrance to the bay, and a rear manifold rack 204 located at a suitable distance from the forward rack 23 within the bay.

The forward rack 203 may be composed of suitable A-frame support members 205 and 206, or the like, which are mounted on opposite sides of the path of the vehicle to be cleaned, and connected at their upper ends by suitable cross member 207. The rear rack 204 may be similarly composed of a pair of A-frame support members 208 and 209, which are also positioned on opposite sides of the vehicle path in and out of the bay, and connected at their upper ends to a suitable cross member 210.

A control box 224 is shown conveniently mounted on the forward edge of the A-frame support member 206, and wheel guards 218–221 may be included as hereinbefore mentioned to protect the system. The equipment console 225 may be located in any suitable place within the bay.

In the system 200 depicted in FIG. 6, a lateral overhead member 201 is fixedly connected to and supported between the upper ends of the A-frame support members 205 and 209 along one side of the vehicle path, and a similar lateral overhead member 202 is fixedly connected to and supported between the upper ends of the other A-frame support members 206 and 208 on the other side of the path.

As will hereinafter be apparent, a pre-soak manifold is mounted within the forward A-frame support members 205 and 206, and in the cross member 207, with nozzles suitably aimed across the path of the vehicle. In addition, a wash manifold having suitably aimed nozzles 227 may be mounted in the A-frame support and cross members 205–207, and may include lateral wheel extensions 213–214 with nozzles 217A (which are preferably of the revolving type) arranged to direct detergent spray against the wheels of the vehicle. As may further be seen, the wash manifold may also be provided with other portions mounted in the lateral overhead members 201 and 202 and continuing down the rear A-frame support members 208 and 209 to connect with other wheel extensions 215 and 216 having nozzles 217B which are also arranged to direct detergent spray against the front wheels of the vehicle.

A rinse manifold having nozzles 211 may be arranged in the lateral overhead members 201 and 202, and in the cross members 207 and 210, and may include portions extending downward in the A-frame support members 205–206 and 208–209. In addition, a separate de-ionized water manifold 300 such as that depicted in FIG. 1 may be mounted on the under sides of the cross members 207–208 and the lateral overhead members 201 and 202.

In operating the system 200, the vehicle may be driven slowly into the bay as hereinbefore described, and when the front wheels reach the forward hose actuator 222, suitable control circuitry will respond to route a low pressure or gentle flow of pre-soak liquid into the aforementioned pre-soak manifold, whereby a curtain of hot pre-soak fluid is discharged across the vehicle from the nozzles 226 in the forward A-frame support members 205–206 and in the overhead cross member 207 comprising the forward manifold rack 203. When the vehicle reaches the rear manifold rack 204 and the front wheels depress the rear hose actuator 223, discharge of pre-soak fluid will cease.

Any of several different automatic and manual wash and rinse sequences may be provided for in apparatus such as this system 200, depending on the particular arrangement of the aforementioned manifolds. For example, the system 200 may be programmed such that, after the vehicle is backed out of the bay and its front wheels roll over the front hose actuator 222, a high pressure curtain of detergent may be directed across the path in the forward manifold rack 203, and the vehicle may thus be driven back into the bay through this curtain. When the front wheel or wheels again depress the rear hose actuator 223, the detergent curtain may be discontinued from the nozzles 227 in the forward manifold rack 203, and high pressure jets of detergent may then be discharged from the wheel nozzles 217A and 217B for either a preselected time interval such as 30 seconds, or until interrupted by a suitable manual control switch in the control box 224.

Next, a regular rinse of tap water or the like may be ejected from the nozzles 211 and 212 and the like in the lateral overhead members 201 and 202, and in the cross members 207 and 210, for either an indeterminate or a predetermined period, and thereafter a 30 second bath of de-ionized water may be discharged onto the vehicle to flush off the tap water. The regular rinse cycle may commence automatically after a predetermined time delay following interruption of the wash cycle, or it may be manually initiated following the use of hand gun equipment as suggested with respect to the system depicted in FIG. 1.

Figure 7:
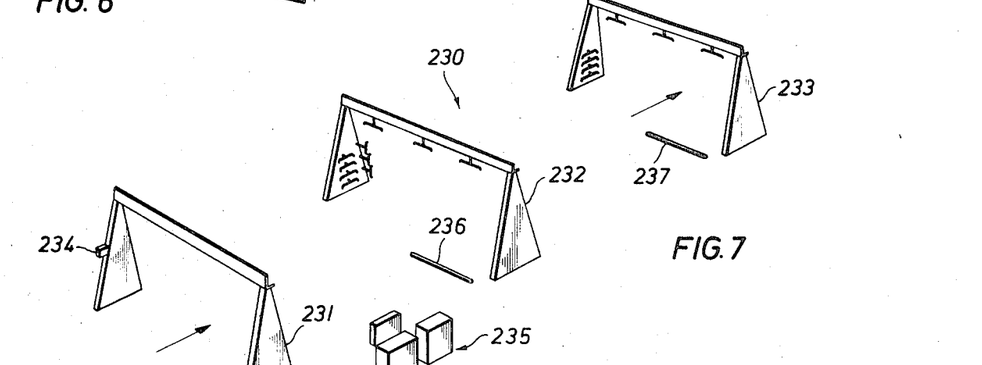
FIG. 7 is a functional representation of another different form of apparatus of the type depicted generally in FIGS. 1, 4 and 6.

Referring now to FIG. 7, there may be seen another form of cleaning system 230 embodying the concept of the present invention and adapted for "drive-through" operation rather than "drive in-back out" operation, as in the systems heretofore described. In particular, the system 230 may include a first or pre-soak rack 231 arranged at a first location across the travel path of the vehicle and having provision for discharging a gentle or low pressure spray curtain of hot pre-soak fluid containing a wetting agent at this first location. A wash rack 232 may be positioned across the path at a second location spaced suitably from the first location and including provision for discharging a high pressure spray of detergent over the vehicle at this second location. A third rinse rack 233 may be positioned across the path of the vehicle at a suitable third location, and hose actuators 236 and 237 may be located suitably in front of the wash and rinse racks 232 and 233 respectively. The system 230 will also include suitable tanks and pumping equipment 235, and a control box 234 which may be conveniently mounted on the front of the pre-soak rack 231.

In operating the system 230, the pre-soak rack 231 may be actuated either manually or by a third hose actuator (not depicted) which may be positioned immediately in front of and across the path of the vehicle. When the front wheels of the vehicle intercept the hose actuator 236, this may discontinue the pre-soak spray from the pre-soak rack 231 and actuate the wash rack 232 to provide a high pressure spray of detergent across the path of the oncoming vehicle. When the front wheels of the vehicle reach the rear hose actuator 237, this may discontinue the wash spray at the second location.

The rinse rack 233 may now be actuated immediately by the hose actuator 237, or only after a preselected automatic delay interval sufficient to permit the operator of the system 230 to service the vehicle with the hand guns hereinbefore mentioned. Alternatively, the rinse rack 233 may be connected to actuate and to discharge a stream or spray of rinse fluid across the path at the third location as the vehicle leaves the system 230.

Figure 8:
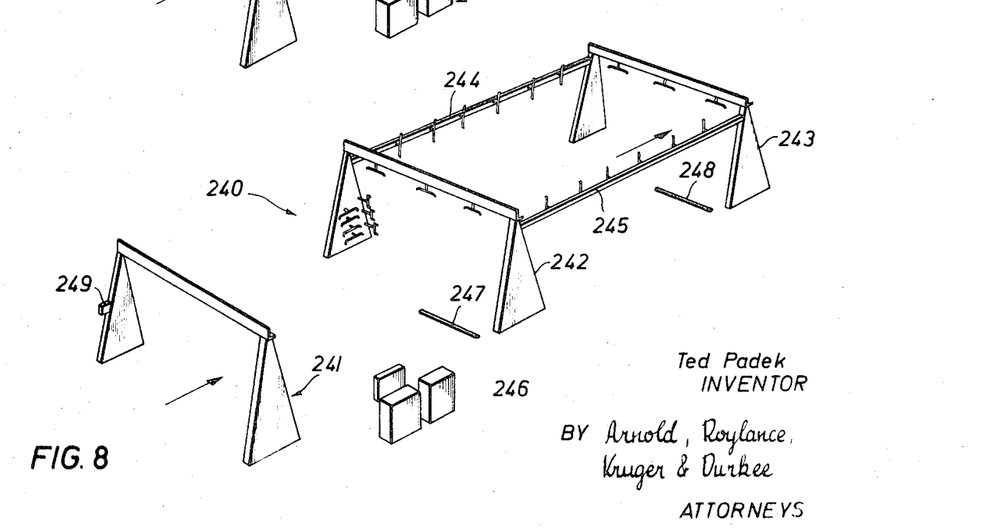
FIG. 8 is a functional representation of a further different form of apparatus of the type depicted generally in FIGS. 1, 4, 6 and 7.

Referring now to FIG. 8, there may be seen a further form of the apparatus depicted in FIg. 7, wherein the vehicle cleaning system 240 is also preferably a "drive through" type. In particular, a pre-soak rack 241 is arranged to straddle the path of the vehicle at a first location, and second and third manifold racks 242 and 243 having lateral overhead members 244 and 245 are located respectively at second and third locations therein. The system 240 will include the usual tanks, pumps and other equipment 246, of course, and may further include a control box 249 mounted on the forward edge of one leg of the pre-soak rack 241.

The pre-soak rack 241 may be actuated either manually or by a suitably arranged hose actuator (not depicted) as hereinbefore explained. A hose actuator 247 may be located across the path of the vehicle immediately in front of the second rack 232, and another hose actuator 237 may be located across the vehicle path immediately in front of the third rack 243.

In this system 240, the pre-soak rack 241 will be deactuated by contact of the front wheels with the hose actuator 247, and a high pressure spray of detergent will concurrently be discharged from the second rack 242 across the path at the second location. When the front wheel of the vehicle strikes the other hose actuator 248, the second rack 242 is preferably inactivated, and the vehicle is then preferably halted between the second and third racks 242 and 243. Thereupon, high pressure detergent may be automatically discharged against the vehicle wheels and fender portions for a preselected limited time interval.

After a further delay interval which may be utilized by finishing off the vehicle with hand guns, and which may be either indeterminate or predetermined, a tap water rinse may discharge from the lateral overhead members 244 and 245, and from the cross member portions of the second and third racks 242 and 243, for a preselected or indeterminate period for flushing the detergent from the halted vehicle. If the period is indeterminate, then a discharge of de-ionized water may be manually and selectively initiated from the third rack, to flush off the tap water on the vehicle as it leaves the system 240. On th other hand, the discharge of de-ionized water may commence automatically upon the expiration of the regular rinse cycle.

It will further be apparent from the foregoing that various modifications and variations may be made in the structures and procedures described herein without substantial departure from the essential concept of the present invention. Accordingly, it should be clearly understood that the forms of the invention described herein and depicted in the accompanying drawings, are exemplary only and are not intended as limitations on the scope of the present invention.

What is claimed is:

1. Apparatus for cleaning the exterior surfaces of a vehicle or the like traveling along a path extending through first and second spaced-apart locations therein, comprising heating means containing a supply of water heated to a preselected temperature and subject to a relatively low pressure, a detergent tank interconnected with said heating means and containing a supply of detergent liquid, deionizing means for establishing a supply of de-ionized water, a first manifold fixedly straddling said path at said first location for presenting a curtain of heated detergent liquid to said vehicle, a second manifold movably disposed above said path and between said locations for circumambulating said vehicle, a third manifold movably interconnected and disposed with said second manifold above said path and between said locations for circumambulating said vehicle, a presoak fluid control valve interconnecting said heater and tank with said first manifold, a first pressuring means interconnected with said heater, a second pressuring means interconnecting said tank and said first pressuring means, a third pressuring means interconnecting said deionizing means and said third manifold, a cleaning fluid control valve interconnecting said first pressuring means and said second manifold, first switch means for opening said presoak fluid control valve in response to the approach of said vehicle to said first location, second switch means for closing said presoak fluid control valve in response to the arrival of said vehicle at said second location and opening said cleaning fluid control valve and for energizing said first, second and third pressuring means in predetermined operating sequence in response to the arrival of said vehicle at said second location, and traveling means responsive to said second switch means for lowering and raising said second and third manifolds about said vehicle in correlation with said operating sequence.

2. The apparatus described in claim 1, wherein said control means further includes cycling means to cause said traveling means to lower and then raise said overhead rack about said vehicle during a wash interval and to thereafter cause said traveling means to lower and then raise said overhead rack about said vehicle during an ordinary rinse interval, said cycling means also opening said wash control valve during said wash interval, said rinse control valve during said ordinary rinse interval, and said de-ionized water valve during a de-ionized rinse period of predetermined duration and beginning with the completion of said ordinary rinse cycle.

3. The apparatus described in claim 2, further comprising eductor means for siphoning liquid from said detergent tank to said first manifold in response to liquid flow between said presoak shutoff valve and said first manifold.

4. The apparatus described in claim 1, wherein said switch means includes first pressure hose means disposed across said path before said first location, a first actuating switch responsive to compression of said first pressure hose means by said vehicle, second pressure hose means disposed across said path between said locations and spaced from said first pressure hose a distance greater than the length of said vehicle, a second actuating switch responsive to compression of said second pressure hose means by said vehicle, and control means interconnected between said actuating switches and said traveling means, valves, and pressuring means for establishing said operating sequence.

5. The apparatus described in claim 4, wherein said control means includes latching means responsive to said first actuating switch for opening presoak fluid control valve and responsive to said second actuating switch for closing said presoak fluid control valve, and circuit means also responsive to said second actuating means for energizing said pressuring and traveling means according to said operating sequence.

6. The apparatus described in claim 5, wherein said circuit means includes cycling means for energizing said traveling means during a first wash interval and thereafter during a regular rinse interval, energizing both first and second pressuring means during said wash interval and only said first pressuring means during said regular rinse interval, and energizing only said third pressuring means during a subsequent deionized rinse interval.

7. The apparatus described in claim 6 wherein said traveling means lowers and raises said second manifold about said vehicle during said wash interval and lowers and raises said second manifold about said vehicle during said regular rinse interval.

8. The apparatus described in claim 7, further including wheel washing means interconnected between said second manifold and said cleaning fluid control valve for discharging detergent liquid against the wheel portions of said vehicle during said wash interval.

* * * * *